US008145534B2

(12) United States Patent
Woolard

(10) Patent No.: US 8,145,534 B2
(45) Date of Patent: Mar. 27, 2012

(54) ONLINE BIRTHDAY REGISTER

(75) Inventor: Robert Woolard, San Antonio, TX (US)

(73) Assignee: Robert M. Woolard, San Antonio, TX (US)

( * ) Notice: Subject to any disclaimer, the term of this patent is extended or adjusted under 35 U.S.C. 154(b) by 1321 days.

(21) Appl. No.: 11/803,613

(22) Filed: May 16, 2007

(65) Prior Publication Data
US 2008/0288360 A1    Nov. 20, 2008

(51) Int. Cl.
*G06Q 30/00* (2012.01)
(52) U.S. Cl. ........................................................ 705/26.1
(58) Field of Classification Search ................. 705/26.1, 705/27.1
See application file for complete search history.

(56) References Cited

U.S. PATENT DOCUMENTS

| | | | | |
|---|---|---|---|---|
| 6,321,211 | B1 * | 11/2001 | Dodd | 705/26.8 |
| 6,609,106 | B1 * | 8/2003 | Robertson | 705/5 |
| 7,117,168 | B2 * | 10/2006 | Eaton | 705/14.1 |
| 2002/0052784 | A1 * | 5/2002 | Sherwin et al. | 705/14 |
| 2002/0143664 | A1 * | 10/2002 | Webb | 705/27 |
| 2004/0249712 | A1 * | 12/2004 | Brown et al. | 705/14 |
| 2005/0038712 | A1 * | 2/2005 | Veeneman | 705/26 |
| 2005/0091120 | A1 * | 4/2005 | Auletta | 705/26 |
| 2006/0085358 | A1 * | 4/2006 | Blouzard et al. | 705/65 |
| 2008/0162271 | A1 * | 7/2008 | Benjamin | 705/10 |
| 2010/0217658 | A1 * | 8/2010 | Yankelevich et al. | 705/14.13 |

OTHER PUBLICATIONS

Author unknown, "Joe's knows marketing," Discount Store News, Mar. 6, 1995, vol. 34, Iss. 5; p. 6.*

* cited by examiner

*Primary Examiner* — Jeffrey A Smith
*Assistant Examiner* — Brandy A Zukanovich

(57) ABSTRACT

Online birthday register software system, allowing a user to register his personal information including birth date online. The system allows a user to search for and select gifts by category and sub category and provides a method for the user to select gifts and to print customized gift certificates. The gift certificates and proof of birth date can be presented to participating businesses for redeeming free or discounted gifts. The software system provides a method for participating businesses to monitor the birthday register site for user gift selection and buying activities. The facilitator of the online site has the ability to monitor the certificate activity of the users so that the facilitator can charge participating businesses a referral fee for each gift certificate. The software system is capable of matching zip codes of registered users to zip codes of local businesses.

6 Claims, 6 Drawing Sheets

Restaurant & Food

| | | |
|---|---|---|
| ○ American | ○ Barbecue | ~54 |
| ○ Chinese | ○ Family | |
| ○ French | ⦿ Indian | ~56 |
| ○ Italian | ○ Japanese | |
| ○ Korean | ○ Mexican | |
| ○ Seafood | ○ Steak | |
| ○ Thai | ○ Vietnamese | |
| ○ Pizza - Delivered & Take Out | ○ Pizza - Dine In | |
| ○ Sub Shop | ○ Candy | |
| ○ Bagels | ○ Bakery | |

FIG. 4

ONLINE BIRTHDAY REGISTER

CROSS REFERENCE TO RELATED APPLICATIONS

Not Applicable

STATEMENT REGARDING FEDERALLY FUNDED SPONSORED RESEARCH DEVELOPMENT

Not Applicable

DESCRIPTION OF ATTACHED APPENDIX

Not Applicable

BACKGROUND OF THE INVENTION

This invention relates generally to the field of online registries and more specifically to an online birthday gift register.

The occasion of a person's birthday is associated with gift giving activities. Some businesses, such as restaurants, give a person a free desert or other food item when the patron presents a form of identification showing that it is their birthday. More recently, with the advent of the Internet, products and services are being purchased on line. A person can enter a web site domain and view photos of various products and purchase those products via an online payment processes. Some retail stores have set up computerized gift registries where a person can enter gifts they would like to receive so that people interested in buying a gift for that person can view the list and choose a gift that they know will appeal to the receiver of the gift. Still others have patented ways for a person to have access to gifts or incentives via an Internet web site such as Kazumori Ukigawa et al in his U.S. Pat. No. 6,938,098. Other patented gift registry concepts are:

Steven Robertson—U.S. Pat. No. 6,609,106;
Francis Eaton, U.S. Pat. No. 7,117,168;
Rod Auletta, Patent application 2005/0091120A1
William Veeneman, Patent application 2005/0038712A1
Sean Brown et al, patent application 2004/0249712A1
Brett Webb, patent application 2002/0143664A1
William Dodd, U.S. Pat. No. 6,321,211B1

However, there are deficiencies in the prior art sited because none of the art sited addresses the ability of a person to register his or her birth date on line and to be able to select free or discounted birthday gifts and to print customized certificates for presentation to local participating businesses.

BRIEF SUMMARY OF THE INVENTION

The primary object of the invention is to provide an online birthday register that allows registered users to select free gifts from participating businesses.

Another object of the invention is to provide an online birthday register that allows users to search for gifts by category and sub category.

Another object of the invention is to provide an online birthday register that allows the user to print customized gift certificates to be presented to participating businesses to obtain free birthday gifts.

A further object of the invention is to provide an online birthday register that allows participating merchants to track their account balance, referral fees, gift certificate inventory and registered users gift selection and buying activity.

Yet another object of the invention is to provide an online birthday register that allows the facilitator of the online site to track gift certificates and to collect referral fees from the participating businesses.

Another object of the invention is to provide an online birthday register that allows the facilitator of the online site to track gift certificates issued, account balances, certificate inventory, user profile information and referral fee payments.

Another object of the invention is to provide an embodiment of an online birthday register that allows a user to pick a predetermined number of gift categories and two weeks before the user's birthday, links to the gift certificates are automatically Emailed to the user in the categories of gifts the user pre-selected.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed an online birthday gift register comprising: a birthday gift register software system, said system allowing a user to register his or her personal information including birth date online, said system allowing a user to search gifts by category and sub category online, said system providing a method for a user to select a gift and to print a customized gift certificate, said gift certificate capable of being presented to a participating business for redeeming a free gift, said software system providing a method for participating businesses to monitor said birthday register online site for user gift buying activities, said software system providing the facilitator of the online site the ability to monitor the certificate downloading and or printing activity of the users so that the facilitator can charge the participating business a referral fee for each certificate, and said software system capable of matching zip codes of registered users to zip codes of local businesses.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 4 shows a diagram of how users can view gifts by sub category.

FIG. 6 shows a diagram of an alternate embodiment where the user pre-selects gift categories he or she wishes to receive certificates from.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
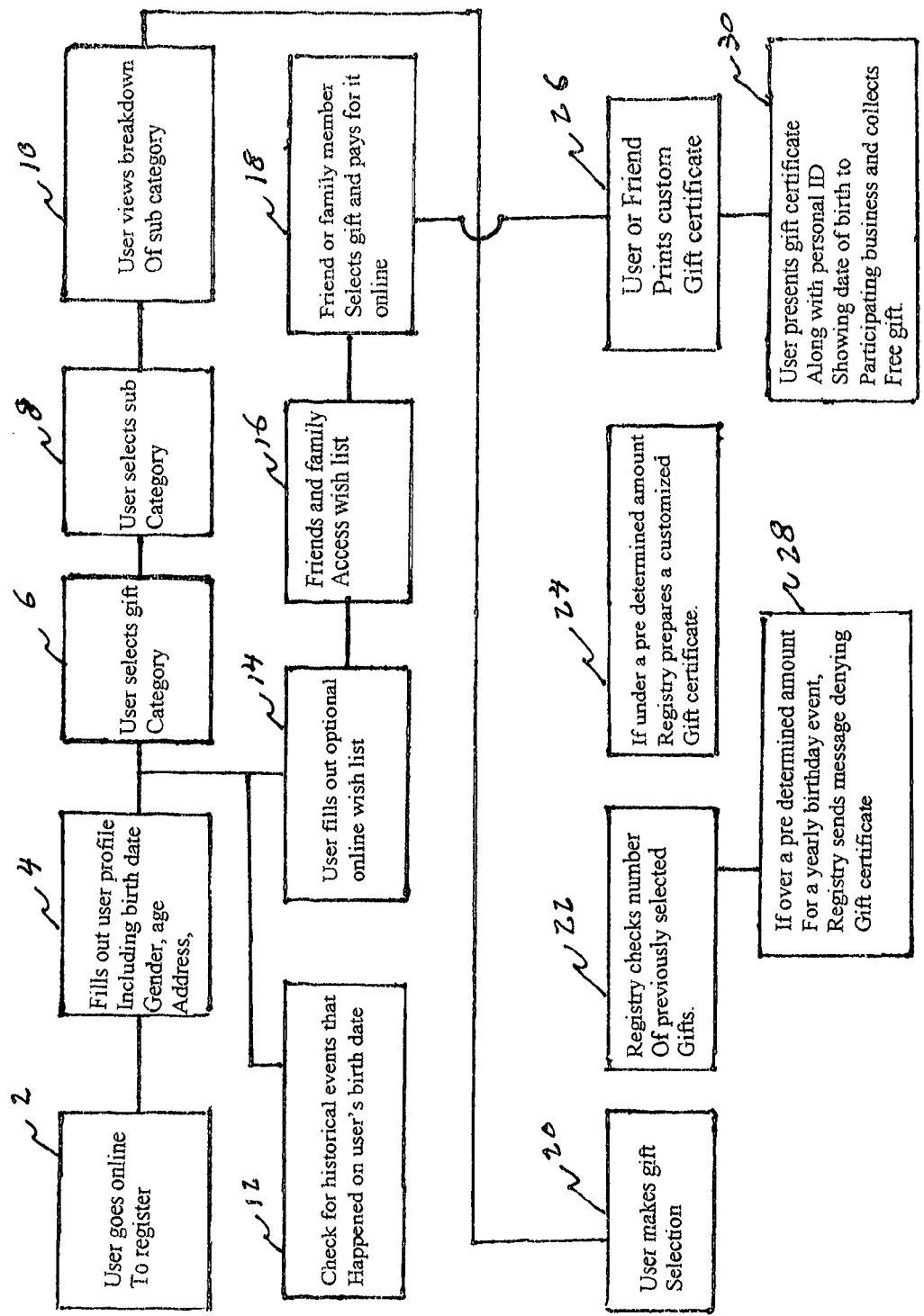
FIG. 1 is a block diagram of the flow of actions for a person to sign up with and use the birthday gift registry of the present invention.

Referring now to FIG. 1 we see a block diagram of the user interface portion of the software system of the birthday gift register of the present invention. The user enters the birthday gift register 2 by using his or her computer and Internet service to access www.thebirthdayregister.com web site. Once at the site, the user is told of the advantages of using the site and that by signing up and registering on the site, he or she is entitled to receive free or discounted birthday gift certificates. For purposes of simplicity, the term "free" will be used in the rest of the present description in place of the words "free or discounted".

The potential user is also told that personal information that they enter as they sign up will be made available to participating businesses on a "blind" basis. That is, the participating business can learn about the user's preferences and personal data but not know the user's name or Email address. The users are also told that their data will not be disclosed or sold to any other retailers, third parties or list gatherers.

The user then fills out the user profile 4 which includes such personal information as name, age, Email, gender, and birth date. The user is then given a pass code so that when the user enters the site in the future, he or she can go directly to the gift selection category 6.

Alternately, the present birthday register system may be set up so that the user is allowed to visit the gift selection portion 6 of the site first, thereby increasing the user's inclination to register onto the birthday register site.

The registered user also has the option to enter his or her birth date and see a historic record 12 of events that happened on that date or famous people who were born on that day and/or date.

Figure 3:
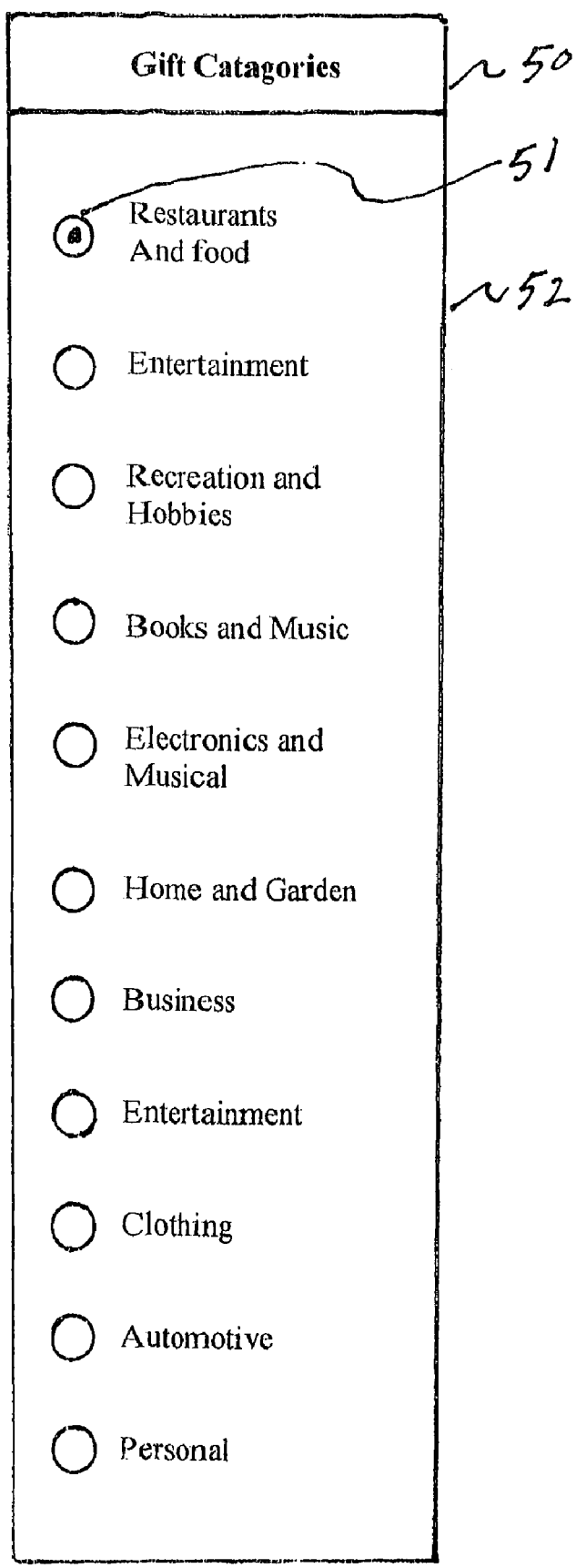
FIG. 3 shows a diagram of how users can view gifts by category
Figure 5:
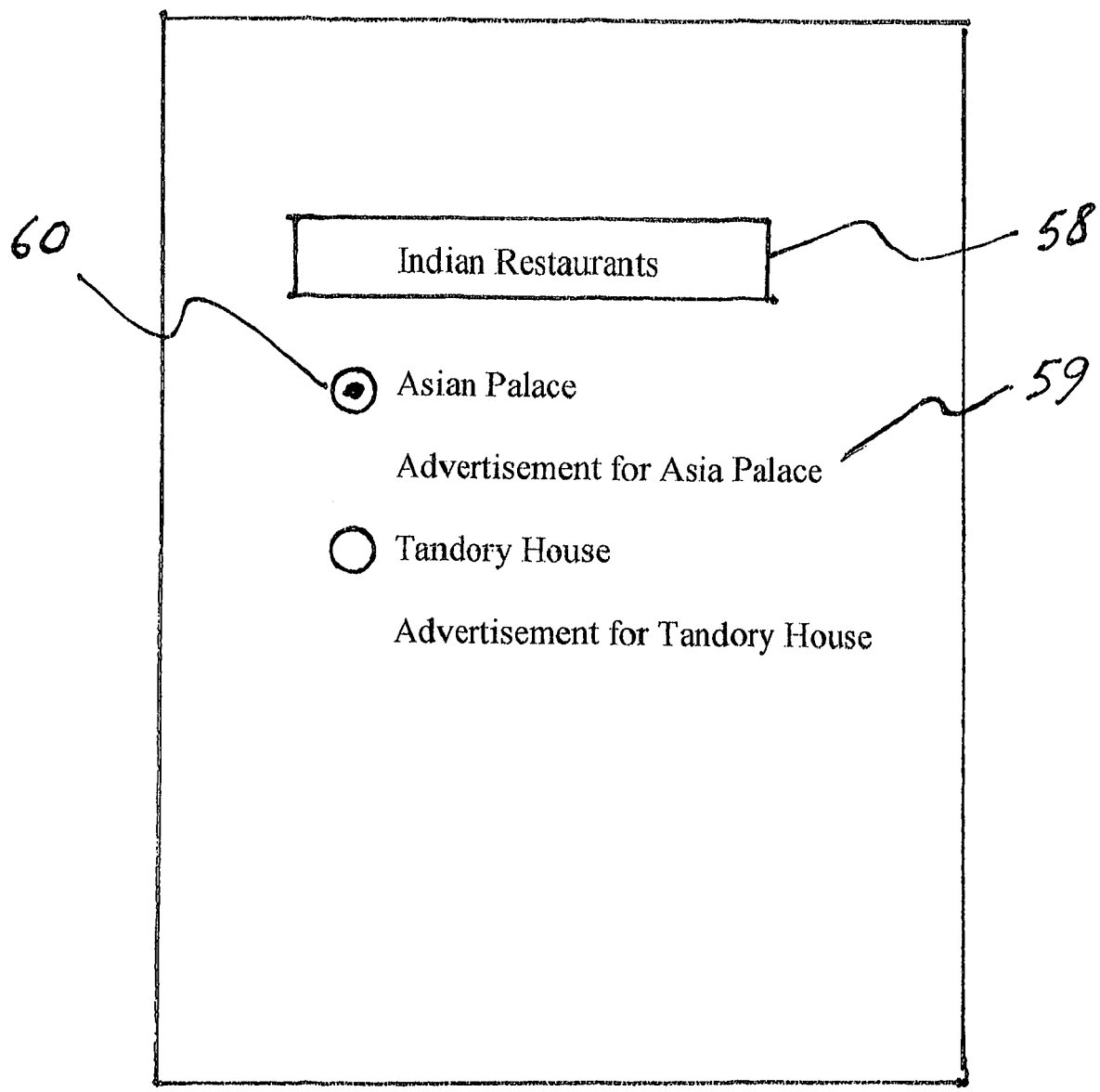
FIG. 5 shows a diagram of how users can view gifts from a list based on sub category.

After the user selects the gift category, a gift category heading 50 is displayed, as shown in FIG. 3, that shows the user a choice of gift categories 52. In this case the user has chosen the Restaurants and Food category 51 as evidenced by the dot 51 placed before that category. The software system then automatically shifts to the Restaurant and Food page that displays a plurality of types of food 54 as shown in FIG. 4. In this case the user has picked Indian food 56. The system then automatically advances to the Indian restaurant page heading 58 as shown in FIG. 5. This page displays the names of Indian restaurants 60 as will as advertising materials 58 and gift offer for each restaurant. The user then picks the restaurant of his or her choice, in this case "Asian Palace"

Referring back to FIG. 1, the user now selects this option 20. The gift registry then checks on how many gift certificates he or she has already selected 22. A pre determined number, for example five gifts, is set as a limit for any one calendar year birthday. If the selection is over the limit 28, the system sends the user a friendly note explaining that the gift limit has been reached. If the gift limit has not been reached, 24 the system prepares a gift certificate that includes the user's name, birth date and zip code for the gift to be received and any other custom information about the gift. For example, there may be an expiration date, or a specific time of day to use the certificate, or there may be a printed bar code or other special number sequence that the business issuing the gift can scan. The user then prints out the gift certificate 26 and can then show the certificate along with proof of identification, zip code and birth date, and claim his or her gift 30 from the participating business.

Optionally, the user can create a wish list 14 by looking at the various gifts that are available from participating businesses or by filling in a space provided for gifts that do not appear on the gift registry. Friends or family can be notified of this list 16 and told how to access the list in order to choose a gift for the user. The friend or family member can view the list, select a gift 18, pay for it online, and then have a custom gift certificate printed out 26 to give to the user so that he or she may present the certificate to the appropriate business establishment and receive his or her gift 30 or have the gift shipped directly to the user. Friends or family also have the option to purchase and receive the gift so that they can give the gift to the user.

Figure 2:
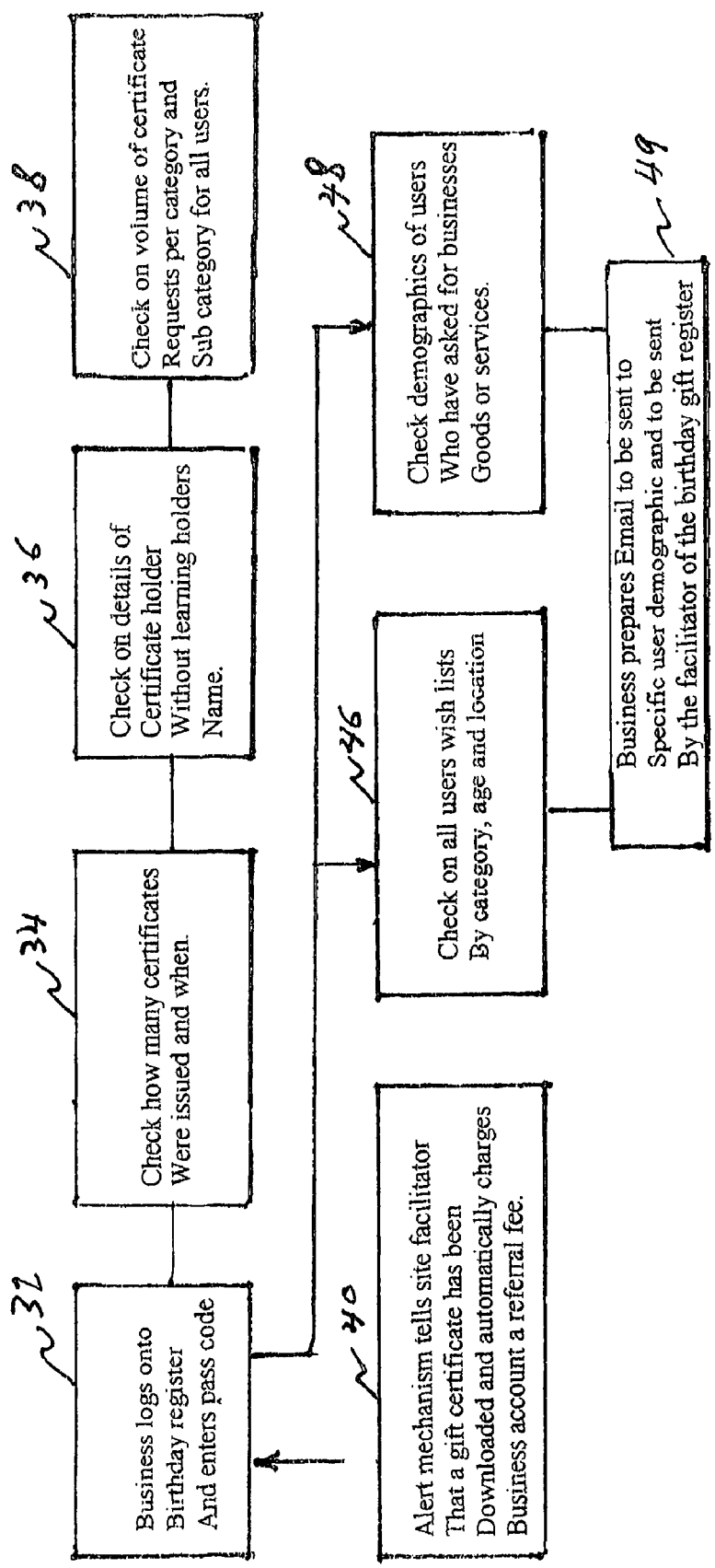
FIG. 2 is a block diagram of the flow of actions that a participating business can take regarding activities of registered users and the offering of targeted Emails to users based on user profiles.

FIG. 2 shows a block diagram of features that are available to participating businesses and to the facilitator of the gift register site. A participating business can log onto the secured section of the site 32 by entering a special pass code. The participating business can then check on how many gift certificates 34 have been selected by users and assigned to a business regarding the use of the participating businesses goods or services. This information can help the business to prepare for delivery of the free gifts promised to users. The participating business can also check on user's activity such as the volume of certificate requests per category 38. These types of statistics can let the business know what categories of gifts are most popular at any given time. A participating business can also check on users wish lists 46 to determine what people are interested in purchasing. The statistics can be broken down according to age or zip code, however, the lists do not give out individual users names or Email addresses. The register software system can also compile demographic patterns of users who have asked for specific business goods or services 48 so that a participating business can target their offerings to those specific demographics.

Additionally, participating business can prepare targeted Email solicitations 49 based on user demographics and forward them to the facilitator of the site so that the solicitations are matched with the user's interests, yet the businesses do not have direct access to user's names and addresses. These solicitations can also be sorted by user zip code number so that adverting appeals can be made to specific section of a city or county.

An alert mechanism 40 notifies the facilitator of the site as to when a user, or friend or family member of a user has a gift certificate. This information lets the business know when to expect the user to come in to receive a gift, and it also automatically informs the facilitator of the event. It also causes a referral fee to be extracted from the businesses online account to be paid to the facilitator of the birthday register.

Other alerts are sent to the facilitator when a current user refers a friend to the site or when a user persuades a business to sign up with the site. In both cases, the user receives additional gift credits for causing the new referral.

Figure 6:
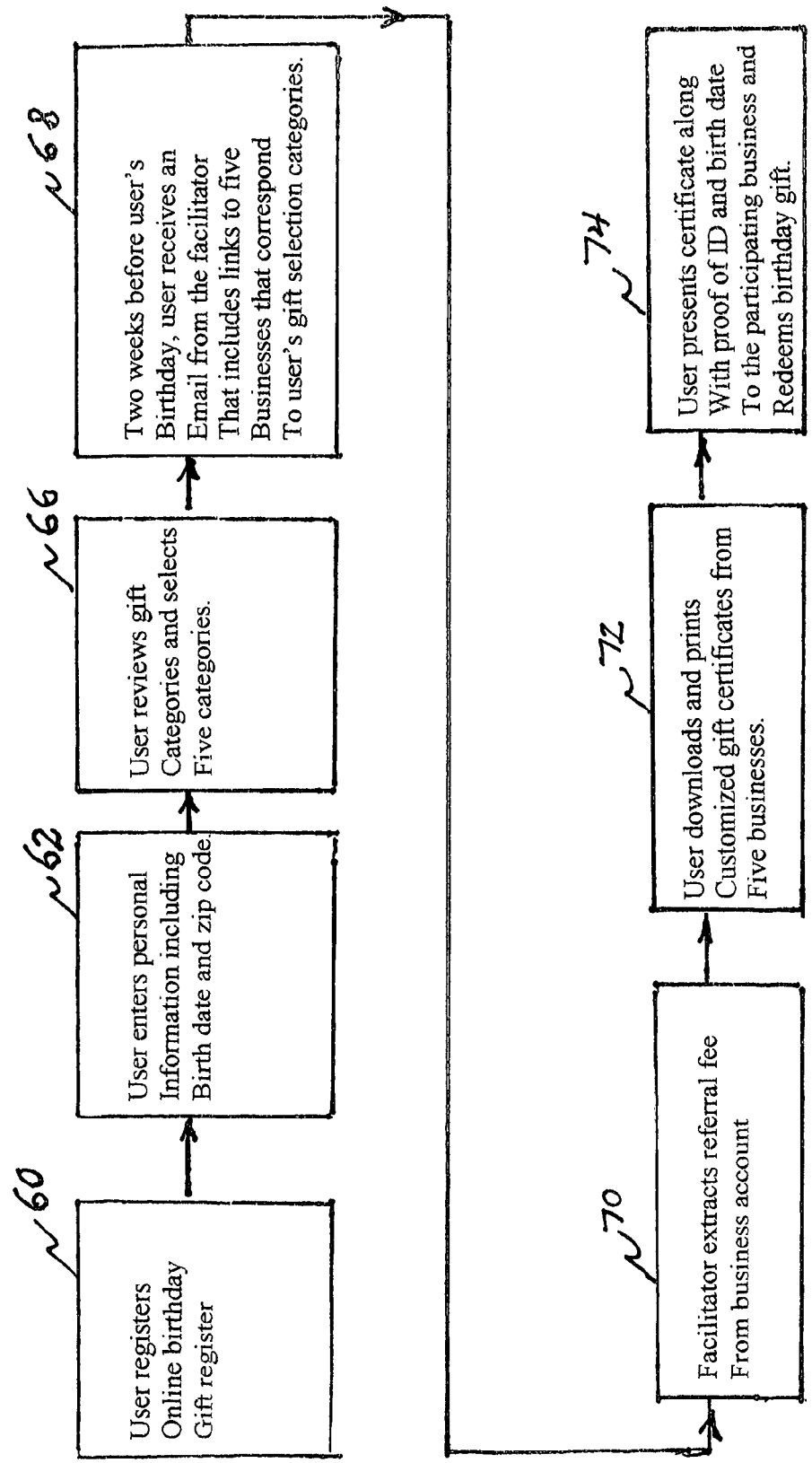

Referring now to FIG. 6 we see an alternate embodiment of the present invention where a user registers an the online birthday register of the present invention 60 and enters his or her personal information 62 including birth date, gender and age. The user is then invited to review a list of gift categories 66 as shown in the category selection guide in FIG. 3 and to select a fixed amount of categories, for example five categories. Two weeks before the user's birthday 68 the user receives an Email from the facilitator of the site which includes links up to five business gift certificates that are in the categories that the user pre selected. The links include printable personalized gift certificates from the five participating businesses. The facilitator extracts a referral fee 70 from each participating business when the user prints the certificate 72.

On or about the date of the user's birthday, the user can present the certificate 74 to the participating business along with personal identification and receive a free gift from the participating business.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A birthday register system comprising:
   a computer configured to provide access through a network to a birthday gift register software system;
   a birthday gift register software system configured to:
      register a user's personal information including his or her birth date and zip code through the birthday gift register website;
      match the zip codes of registered users to zip codes of local businesses;
      search the birthday gift register website, responsive to user input, for gifts by category and sub category;
      provide an option to select a gift and print a customized gift certificate based on said birth date, wherein the gift certificate is capable of being presented to a participating business for redeeming a free or discounted gift;
      monitor the amount of gift certificates the user selects to print for a specific birthday and cutting off certificate access after a pre-determined number of gift selections;
      facilitate monitoring, by the participating businesses, of said online birthday register website for user gift selection and buying activities; and
      facilitate monitoring, by a facilitator of the online birthday register website, gift certificate activity of the users so that the facilitator can charge the participating business a referral fee for each printed gift certificate.

2. The birthday register system of claim 1, wherein the birthday gift register software system is further configured to:
   compile a wish list of gifts from participating businesses, responsive to user selections, wherein the wish list is viewable by the user's friends and family online;
   provide an option to the user's friends and family online to select a gift from the wish list; and
   communicate to the participating businesses the purchase of said gift from the wish list.

3. The birthday register system of claim 2, wherein the birthday gift register software system is further configured to facilitate monitoring, by the participating businesses, of said online birthday register website for user wish list activity to gain awareness of current product preferences.

4. The birthday register system of claim 1, wherein the birthday gift register software system is further configured to send targeted emails to registered users based on a registered user's personal information provided during a registration process.

5. The birthday register system of claim 1, wherein the birthday gift register software system is further configured to:
   store historical data including historical events for each day of the year; and
   provide the historical events that occurred on the registered user's birth date, to the registered user.

6. The birthday register system of claim 1, wherein the birthday gift register software system is further configured to provide gift credits to a registered user when the registered user refers a new user to the birthday register website or when the registered user causes a new business to join the birthday register website.

* * * * *